Patented July 22, 1941

2,249,782

UNITED STATES PATENT OFFICE 2,249,782

METHOD OF SETTING COATING COMPOSITIONS

Adolph J. Pingarrón, Woodside, N. Y., assignor to Interchemical Corporation, New York, N. Y., a corporation of Ohio No Drawing. Application February 9, 1938, Serial No. 189,704

17 Claims. (Cl. 101—416)

This invention relates to liquid film forming compositions, and has particular reference to a new and novel method of hastening the drying of films of such compositions.

Film forming compositions are applied in liquid state, and are dried by conversion into solid form. The conventional methods of effecting this conversion, which include cooling (as of melted materials which are applied hot), oxidation (as of drying oils), evaporation of solvent (as of nitrocellulose lacquers), and polymerization (as of heat convertible synthetic resins) are incapable of more than a limited utilization, because they do not combine flexibility of application with speed of dry at room temperature.

I have discovered a method of drying film forming compositions which overcomes this difficulty with conventional methods, and which comprises incorporating into the wet film a thickener soluble therein, and preferably one for which the ingredients of the film have a low solvent power, but which is compatible therewith, so that a small percentage forms a solution with the film vehicle of heavy plastic or solid consistency. The incorporation is preferably accomplished by impregnating the wet film with a solution of the thickener in a volatile solvent miscible with the film vehicle; on evaporation of the added solvent, the mixture in the film changes from the liquid stage to the solid, and thus dries.

The principal advantage of this method lies in the fact that the application advantages of very slow drying finishes may be obtained by their use, and, by a simple addition, the film attains the speed of dry of the very fastest lacquers, which are limited as to applicability because they lose solvent so rapidly at ordinary temperatures.

Thus, for example, a conventional linseed oil printing ink may be prepared as follows:

| | Parts by weight |
|---|---|
| Carbon black | 20 |
| Liquid cobalt drier (3% cobalt) | 5 |
| Lithographic varnish (linseed oil, kettle bodied at about 590° F. to a viscosity of 20 poises at 75° F.) | 75 |

This type of ink is extensively used for typographic printing, because it does not dry on the distribution system of the press. In conventional practice, prints made with this type of ink must be slip-sheeted, to prevent transfer of ink from the wet impression to the reverse side of the next print. At ordinary room temperatures (60–90° F.), drying of this ink takes many hours.

I have dried this ink rapidly at room temperatures by my method, by applying to the wet film a 5% solution of high viscosity (1,000 centipoises) chlorinated rubber (sold under the trade name "Tornesit") in toluol. The solution of chlorinated rubber mixes with the wet film; on evaporation of the toluol, which occurs in a few seconds, the film becomes a dispersion of pigment in a solution of chlorinated rubber in the particular kettle bodied linseed oil used. Since such solutions are highly viscous masses at room temperature when the amount of chlorinated rubber exceeds 1%, and since such viscous masses, when pigmented, are essentially solid, the ink is dry when the toluol evaporates. While further drying occurs by oxidation, the ink is dry enough to permit of reverse side printing within a few seconds after the chlorinated rubber solution has been applied.

Other thickeners which are miscible with bodied linseed oil and yield plastic to solid solutions in low concentrations are rubber derivative resins such as "Pliolite", high viscosity oil soluble phenolic resins, and ethyl cellulose. Other resins, such as ester gum which yield linseed oil solutions of lower viscosity, may likewise be used to cause drying, but since they must be used in greater concentration, they tend to dilute the ink, and to form visible continuous films over the unprinted portions of the paper.

The thickeners may be used with any volatile solvent therefor which gives a solution miscible with linseed oil; aromatic and aliphatic hydrocarbons, ketones and esters may all be used.

The method of application may be any which impregnates the film to be dried with the setting composition. Spraying provides a convenient method of application, while in printing operations, the setting solution may be applied by an intaglio plate, preferably in register with the printing plate, so that, if desired, the setting solution will be applied only over the wet ink.

Substantially the same setting solutions may be used with other drying oils, and with glycerol phthalate resins, modified with sufficient drying oil acids so that the resins are liquid.

Another type of film forming composition comprises the group which dries by evaporation, and which consists of a plastic to solid binder (such as cellulose derivatives and resins) dissolved in organic solvents. Such "lacquers" are largely made with relatively rapid evaporating solvents, in order to insure fast dry at room temperature; but where stability during application is desired, they are made with solvents which are relatively non-volatile at room temperatures, and which evaporate rapidly at elevated temperatures, drying being effected by heating. My method permits the drying of this latter type of composition without heat.

A typical example of this type of composition is the following typographic printing ink:

| | Parts by weight |
|---|---|
| Carbon black | 20 |
| Varnish—38 parts rosin modified phenol aldehyde resin, 62 parts petroleum hydrocarbon mixture (boiling range 520–575° F.) | 80 |

This ink has good press stability, in that it will not stiffen up due to solvent evaporation in ordinary operation of a printing press. In order to dry this ink, however, at ordinary press speeds of the order of 300 to 500 feet per minute, it has been considered necessary to expose this ink to temperatures of the order of 1000 to 2000° F., and preferably to burn the vapor coming off from the ink. Installations for this purpose are expensive both in original cost and upkeep.

I have dried this ink by my method, by applying to the wet film a 2% solution of high viscosity (1000 second) ethyl cellulose dissolved in a mixture of 50% toluol and 50% denatured alcohol which is miscible with the ink vehicle. The film merges the solution into it; on evaporation of the added solvent, the ink is dry. The reason for such drying is apparent, since the solution of high viscosity ethyl cellulose in the vehicle of the ink changes its viscosity from a molasses-like liquid to a stiff gel.

"Tornesit" and "Pliolite" may also be used for setting this type of ink, although more of these materials is required to yield the desired viscosity increment. Resins which give high viscosity solutions in this type of vehicle may likewise be used, such as alkyd resins modified with low percentages of oil acids and hard rosin ester modified phenolic resins. As with linseed inks, lower viscosity resins may be used, but do not produce optimum results.

With cellulose derivative compositions, I find that high viscosity cellulose derivatives may be used to advantage in the setting compositions. For example, a nitrocellulose ink which is substantially non-drying at room temperatures, such as this yellow ink

| | Parts by weight |
|---|---|
| Hansa yellow toner | 4.1 |
| Lemon cadmium yellow | 19.2 |
| Titanium dioxide | 27.4 |
| Nitrocellulose solution consisting of—10.0 denatured alcohol, 23.3¼ sec. R. S. nitrocellulose, 66.7 butyl carbitol acetate (the acetate of the monobutyl ether of diethylene glycol) | 47.9 |
| Glycol sebacate | 1.4 | has been set by spraying over it a 3% solution of 1000 second nitrocellulose in acetone.

Not only may conventional prior art compositions be used, but materials which heretofore could not be dried may be utilized, such as non-drying oils, solvents which are non-evaporable even at elevated temperatures, and the like. Thus, a non-drying ink of the following formula:

| | Parts by weight |
|---|---|
| Refined castor oil | 80 |
| Carbon black | 20 | was set after printing on paper by spraying the wet ink film with a 2% solution of high viscosity ethyl cellulose in a mixture of alcohol and toluol.

It is highly desirable that the binder of the setting solution be chosen so that a relatively small percentage thereof causes drying, in order to prevent dilution of the film to a point where its appearance and physical properties are substantially altered. In printing operations especially, the use of setting thickeners which give low viscosity with the ink vehicle in low concentration is undesirable, since setting solutions made from them will yield undesirable continuous films on the unprinted portions of the paper. I prefer to operate with setting materials which will produce a substantially dry product when no more than 10% is mixed with the ink.

In general, I find that high-molecular weight cellulose derivatives and resins are most desirable as setting thickeners, since they produce drying with a minimum amount of thickener.

My invention is particularly applicable to the field of typographic and planographic printing, in that entirely press stable inks may be used without sacrificing rapid drying at room temperatures. The process is applicable to all forms of such printing, including sheet and web printing on paper, Cellophane, metal and other surfaces. While particularly applicable to this field it is of course not limited thereto.

In the claims, the term "low solvent power" means that the solvent dissolves the solute, but produces solutions of high viscosity therewith in low concentration.

What I claim is:

1. The method of rapidly setting a film of printing ink comprising pigments dispersed in a linseed oil vehicle which consists in impregnating the ink film with a solution of a film-forming solid which is soluble in linseed oil, dissolved in a volatile solvent miscible with linseed oil, and evaporating the volatile solvent.

2. The method of rapidly setting a film of printing ink comprising pigment dispersed in a linseed oil vehicle, which consists in impregnating the ink film with a solution of a film-forming solid which is soluble in linseed oil, but for which linseed oil has a low solvency, dissolved in a volatile solvent miscible with linseed oil, and evaporating the volatile solvent.

3. The method of rapidly setting a film of printing ink comprising pigment dispersed in a linseed oil vehicle, which consists in impregnating the ink film with a solution of chlorinated rubber dissolved in a volatile solvent miscible with linseed oil and evaporating the volatile solvent.

4. The method of rapidly setting a film of printing ink comprising pigment dispersed in a vehicle comprising a plastic to solid binder dissolved in a solvent substantially non-volatile at 90° F., which consists in impregnating the ink film with a solution of a film-forming solid which is soluble in the ink vehicle, dissolved in a solvent which volatilizes rapidly at 90° F. and which is miscible with the ink vehicle, and evaporating the volatile solvent.

5. The method of rapidly setting a film of printing ink comprising pigment dispersed in a vehicle comprising a solution of resin in a petroleum hydrocarbon substantially non-volatile at 90° F., which consists in impregnating the ink film with a solution of a film-forming solid which is soluble in the ink vehicle, dissolved in a solvent which volatilizes rapidly at 90° F. and which is miscible with the ink vehicle, and evaporating the volatile solvent.

6. The method of rapidly setting a film of printing ink comprising pigment dispersed in a vehicle comprising a solution of resin in a petroleum hydrocarbon substantially non-volatile at 90° F., which consists in impregnating the ink film with a solution of ethyl cellulose in a solvent which volatilizes rapidly at 90° F. and is miscible with the ink vehicle, and evaporating the volatile solvent.

7. The method of rapidly setting a film of printing ink comprising pigment dispersed in a non-drying oil, which consists in impregnating the ink film with a solution of a film-forming solid which is soluble in the ink vehicle, dissolved in a solvent which volatilizes rapidly at 90° F. and which is miscible with the ink vehicle, and evaporating the volatile solvent.

8. The method of rapidly setting a film of printing ink comprising pigment dispersed in a non-drying oil, which consists in impregnating the ink film with a solution of ethyl cellulose in a solvent which volatilizes rapidly at 90° F. and is miscible with the ink vehicle, and evaporating the volatile solvent.

9. The method of setting, in a period of the order of a few seconds, a wet film of film-forming composition which normally sets in a period of the order of many minutes or more, which consists in incorporating into the film, in liquid form capable of rapid reconversion into solid form and free of ingredients not miscible with the film, a normally solid thickener soluble in the film, in sufficient quantity to cause the film to set when the thickener is reconverted, while avoiding the formation of a second continuous film overlying the original film, and thereafter reconverting the thickener from liquid to solid form.

10. The method of setting, in a period of the order of a few seconds, a wet film of film forming composition which normally sets in a period of the order of many minutes or more, which consists in impregnating the film with a thickener soluble in the vehicle of the wet film, distributed in a volatile menstruum miscible with said film vehicle, and evaporating the volatile menstruum.

11. The method of setting, in a period of the order of a few seconds, a wet film of film forming composition which normally sets in a period of the order of many minutes or more, which consists in impregnating the film with a solution of a film forming solid soluble in the vehicle of the film, dissolved in a volatile solvent miscible with said vehicle, and evaporating the volatile solvent.

12. The method of setting, in a period of the order of a few seconds, a wet film of film forming composition which normally sets in a period of the order of many minutes or more, which consists in impregnating the film with a solution in a rapidly volatile solvent which is miscible therewith, of a film forming solid which is soluble in the vehicle of the film, and solidifies it when 10% or less, based on the weight of the wet film, is incorporated therewith; and evaporating the volatile solvent.

13. The method of setting, in a period of the order of a few seconds, printing ink which is sufficiently slow drying to be stable on the distribution rollers of conventional typographic and lithographic presses, on printed material, which consists in impregnating the ink on the printed material with a solution of a film-forming solid which is soluble in the ink vehicle dissolved in a rapidly volatile solvent which is miscible with the ink vehicle, and evaporating the volatile solvent.

14. The method of setting, in a period of the order of a few seconds, a wet printing ink film which is sufficiently slow drying to be stable on the distribution rollers of conventional typographic and lithographic presses, which consists in impregnating the ink with a solution consisting of a rapidly volatile solvent miscible with the ink vehicle and a dissolved film-forming solid for which the ink vehicle has a low solvent power, and evaporating the volatile solvent.

15. The method of claim 14, in which the amount of added film forming solid is 10% or less of the weight of the ink.

16. The method of setting, in a period of the order of a few seconds, a wet printing ink film on paper which is sufficiently slow drying to be stable on the distribution rollers of conventional typographic and lithographic presses, which consists in impregnating the ink with a solution consisting of a rapidly volatile solvent miscible with the ink vehicle and a dissolved film-forming solid for which the ink vehicle has a low solvent power, without forming a continuous film of the film forming solid on the uninked paper, and evaporating the volatile solvent.

17. The method of setting, in a period of the order of a few seconds, a wet printing ink film on paper which is sufficiently slow drying to be stable on the distribution rollers of conventional typographic and lithographic presses, which consists in impregnating the ink with a solution consisting of a rapidly volatile solvent miscible with the ink vehicle and a dissolved film forming solid not present to any substantial extent in the ink and for which the ink vehicle has a low solvent power, without forming a continuous film of the film forming solid on the uninked paper, and evaporating the volatile solvent.

ADOLPH J. PINGARRÓN.